United States Patent
Zhang et al.

(10) Patent No.: US 9,866,606 B2
(45) Date of Patent: Jan. 9, 2018

(54) METHOD FOR SWITCHING BETWEEN MEDIA PLAY DEVICES, AND DEVICE

(71) Applicant: Huawei Device Co., Ltd., Shenzhen (CN)

(72) Inventors: Yajun Zhang, Shenzhen (CN); Yu Zhu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 104 days.

(21) Appl. No.: 14/901,832

(22) PCT Filed: Sep. 4, 2014

(86) PCT No.: PCT/CN2014/085901
§ 371 (c)(1),
(2) Date: Dec. 29, 2015

(87) PCT Pub. No.: WO2015/043368
PCT Pub. Date: Apr. 2, 2015

(65) Prior Publication Data
US 2016/0373503 A1      Dec. 22, 2016

(30) Foreign Application Priority Data
Sep. 25, 2013   (CN) .......................... 2013 1 0442979

(51) Int. Cl.
*G06F 15/16* (2006.01)
*H04L 29/06* (2006.01)
(Continued)

(52) U.S. Cl.
CPC ...... *H04L 65/601* (2013.01); *H04L 29/06476* (2013.01); *H04L 47/767* (2013.01);
(Continued)

(58) Field of Classification Search
CPC .... H04L 12/1827; H04L 29/06476–29/06503;
(Continued)

(56) References Cited

U.S. PATENT DOCUMENTS

2007/0237090 A1   10/2007   Kim et al.
2008/0243998 A1   10/2008   Oh et al.
(Continued)

FOREIGN PATENT DOCUMENTS

CN         101056277 A       10/2007
CN         101355470 A        1/2009
(Continued)

*Primary Examiner* — Brendan Higa

(57) ABSTRACT

The present invention applies to the field of multimedia communication technologies, and provides a method for switching between media play devices, and a device. The method includes: acquiring and displaying a media play device list on a home area network, and determining a to-be-switched-to media play device according to a user operation; sending a request message that carries a browsing history of a media content page of a media server and device capability information of the to-be-switched-to media play device to a remote user interface server RUI Server; receiving a uniform resource identifier URI of a user interface UI sent by the RUI Server; and sending the URI to the to-be-switched-to media play device, so that the to-be-switched-to media play device displays the UI that includes the browsing history.

7 Claims, 10 Drawing Sheets

(51) Int. Cl.
  *H04L 12/919*  (2013.01)
  *H04L 29/08*  (2006.01)
(52) U.S. Cl.
  CPC .......... *H04L 67/025* (2013.01); *H04L 67/148* (2013.01); *H04L 67/303* (2013.01)
(58) Field of Classification Search
  CPC ..... H04L 47/76–47/767; H04L 65/60–65/601; H04L 65/1083; H04L 67/148; H04L 67/303; G06F 17/30017
  See application file for complete search history.

(56) References Cited

U.S. PATENT DOCUMENTS

| | | |
|---|---|---|
| 2008/0288875 A1 | 11/2008 | Oh |
| 2012/0079395 A1 | 3/2012 | Bengualid et al. |
| 2012/0210225 A1 | 8/2012 | McCoy et al. |
| 2013/0290494 A1* | 10/2013 | Goudarzi ............ H04L 65/1046 709/219 |

FOREIGN PATENT DOCUMENTS

| | | |
|---|---|---|
| CN | 101594594 A | 12/2009 |
| CN | 102006219 A | 4/2011 |
| CN | 102421027 A | 4/2012 |

\* cited by examiner

METHOD FOR SWITCHING BETWEEN MEDIA PLAY DEVICES, AND DEVICE

CROSS REFERENCE TO RELATED APPLICATIONS

The present application claims priority under 35 U.S.C. §365 to International Patent Application No. PCT/CN2014/085901 filed Sep. 4, 2014. International Patent Application No. PCT/CN2014/085901 claims priority under 35 U.S.C. §365 and/or 35 U.S.C. §119(a) to Chinese Patent Application No. 201310442979.3 filed Sep. 25, 2013 and which are incorporated herein by reference into the present disclosure as if fully set forth herein.

TECHNICAL FIELD

The present invention relates to the field of multimedia communication technologies, and in particular, to a method for switching between media play devices, and a device.

BACKGROUND

With the development of digital home technologies and widespread digitization of consumer electronics (English: Consumer electronics, CE for short) products, an increasing quantity of electronic devices are appearing in a home, and these electronic devices are connected in a wired manner or a wireless manner to form a home area network, so as to implement a function such as content sharing or mutual control.

To implement interworking between and control on various types of electronic devices, an increasing quantity of electronic devices support Universal Plug and Play (English: Universal Plug and Play, UPnP for short) for the implementation. To implement media content sharing among various types of electronic devices in a home, the UPnP Forum (English: Forum) formulates an audio video (English: Audio Vedio, AV for short) standard, and defines a media server (English: Media Server, MS for short) that is used to provide an AV media resource, and a digital media renderer (English: Digital Media Renderer, DMR for short) and a digital media player (English: Digital Media Player, DMP for short) that are used to decode and play media content that comes from the MS, where the digital media renderer and the digital media player are collectively referred to as media play devices.

Currently, a user may switch media content from one media play device to another media play device by using a control device. However, the switched-to media play device cannot inherit a browsing history of the switched-from media play device.

SUMMARY

An objective of embodiments of the present invention is to provide a method for switching between media play devices, and a device, so as to solve a problem that a switched-to media play device cannot inherit a browsing history of a switched-from media play device to perform media sharing.

According to a first aspect, the method for switching between media play devices includes:

acquiring and displaying, by a control device, a media play device list on a home area network, and determining a to-be-switched-to media play device according to a user operation; sending, by the control device, a request message that carries a browsing history of a media content page of a media server and device capability information of the to-be-switched-to media play device to a remote user interface server RUI Server, where the device capability information includes at least one of: a resolution and a screen size; receiving, by the control device, a uniform resource identifier URI of a user interface UI sent by the RUI Server, where the UI is generated by the RUI Server according to the browsing history and the device capability information; and sending, by the control device, the URI to the to-be-switched-to media play device.

In a first possible implementation manner of the first aspect, before the sending, by the control device, a request message that carries a browsing history of a media content page of a media server and device capability information of the to-be-switched-to media play device to an RUI Server, the method further includes:

recording, by the control device, the browsing history; and acquiring, by the control device, the device capability information.

In a second possible implementation manner of the first aspect, the recording, by the control device, the browsing history of the media content page of the media server is specifically:

recording, by the control device, the browsing history by using a script embedded in a browser.

According to a second aspect, the method for switching between media play devices includes:

acquiring and displaying, by a control device, a media play device list on a home area network, and determining a to-be-switched-to media play device according to a user operation; sending, by the control device, a request message that carries device capability information of the to-be-switched-to media play device to a remote user interface server RUI Server, where the device capability information includes at least one of: a resolution and a screen size; receiving, by the control device, a uniform resource identifier URI of a user interface UI sent by the RUI Server, where the UI is generated by the RUI Server according to the device capability information; and sending, by the control device, a browsing history of a media content page of a media server and the URI to the to-be-switched-to media play device, where the browsing history is recorded by the control device before the request message is sent.

In a first possible implementation manner of the second aspect, before the sending, by the control device, a request message that carries device capability information of the to-be-switched-to media play device to a remote user interface server RUI Server, the method further includes:

acquiring, by the control device, the device capability information.

In a second possible implementation manner of the second aspect, that the browsing history is recorded by the control device is specifically that:

the control device records the browsing history by using a script embedded in a browser.

According to a third aspect, the method for switching between media play devices includes:

receiving, by a remote user interface server RUI Server, a request message that carries a browsing history of a media content page of a media server and device capability information of a to-be-switched-to media play device and is sent by a control device, where the device capability information includes at least one of: a resolution and a screen size; generating, by the RUI Server, a user interface UI according to the browsing history and the device capability information; and sending, by the RUI Server, a uniform resource identifier URI of the UI to the to-be-switched-to media play device by using the control device.

According to a fourth aspect, the method for switching between media play devices includes:

receiving, by a to-be-switched-to media play device, a uniform resource identifier URI of a user interface UI and a browsing history of a media content page of a media server that are sent by a control device, where the UI is generated by a remote user interface server RUI Server according to device capability information of the to-be-switched-to media play device;

acquiring, by the to-be-switched-to media play device, the UI from the RUI Server according to the URI; and generating, by the to-be-switched-to media play device, a new UI that includes the browsing history according to the UI and the browsing history, and displaying the new UI that includes the browsing history.

According to a fifth aspect, the control device includes:

an acquiring unit, configured to acquire and display a media play device list on a home area network, and determine a to-be-switched-to media play device according to a user operation;

a sending unit, configured to send a request message that carries a browsing history of a media content page of a media server and device capability information of the to-be-switched-to media play device to a remote user interface server RUI Server, where the device capability information includes at least one of: a resolution and a screen size; and a receiving unit, configured to receive a uniform resource identifier URI of a UI sent by the RUI Server, where the UI is generated according to the browsing history and the device capability information, where the sending unit is further configured to send the URI to the to-be-switched-to media play device.

In a first possible implementation manner of the fifth aspect, the control device further includes:

a recording unit, configured to record the browsing history.

In a second possible implementation manner of the fifth aspect, the acquiring unit is further configured to acquire the device capability information.

In a third possible implementation manner of the fifth aspect, the recording unit is specifically configured to:

record the browsing history by using a script embedded in a browser.

According to a sixth aspect, the control device includes:

an acquiring unit, configured to acquire and display a media play device list on a home area network, and determine a to-be-switched-to media play device according to a user operation;

a sending unit, configured to send a request message that carries device capability information of the to-be-switched-to media play device to a remote user interface server RUI Server, where the device capability information includes at least one of: a resolution and a screen size; and a receiving unit, configured to receive a uniform resource identifier URI of a user interface UI sent by the RUI Server, where the UI is generated by the RUI Server according to the device capability information, where the sending unit is further configured to send a browsing history of a media content page of a media server recorded by the control device and the URI to the to-be-switched-to media play device, where the browsing history is recorded by the control device before the request message is sent.

In a first possible implementation manner of the sixth aspect, the acquiring unit is further configured to acquire the device capability information.

In a second possible implementation manner of the sixth aspect, the control device further includes:

a recording unit, configured to record the browsing history.

With reference to the second possible implementation manner of the sixth aspect, in a third possible implementation manner of the sixth aspect, the recording unit is specifically configured to:

record the browsing history by using a script embedded in a browser.

According to a seventh aspect, the RUI Server includes:

a receiving unit, configured to receive a request message that carries a browsing history of a media content page of a media server and device capability information of a to-be-switched-to media play device and is sent by a control device, where the device capability information includes at least one of: a resolution and a screen size;

a processing unit, configured to generate a user interface UI according to the browsing history and the device capability information; and a sending unit, configured to send a uniform resource identifier URI of the UI to the to-be-switched-to media play device by using the control device.

According to a seventh aspect, the media play device includes:

a receiving unit, configured to receive a uniform resource identifier URI of a user interface UI sent by a control device, where the UI is generated by a remote user interface server RUI Server according to a browsing history of a media content page of a media server and device capability information of a to-be-switched-to media play device;

an acquiring unit, configured to acquire the UI that includes the browsing history from the RUI Server according to the URI; and a display unit, configured to display the UI that includes the browsing history.

It is seen from the foregoing solutions that, the embodiments of the present invention provide a method for switching between media play devices, and a device, which solve a problem that a switched-to media play device cannot inherit a browsing history of a switched-from media play device for media sharing.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

To make the objectives, technical solutions, and advantages of the present invention clearer and more comprehensible, the following further describes the present invention in detail with reference to the accompanying drawings and embodiments. It should be understood that the specific embodiments described herein are merely used to explain the present invention but are not intended to limit the present invention.

Figure 1:
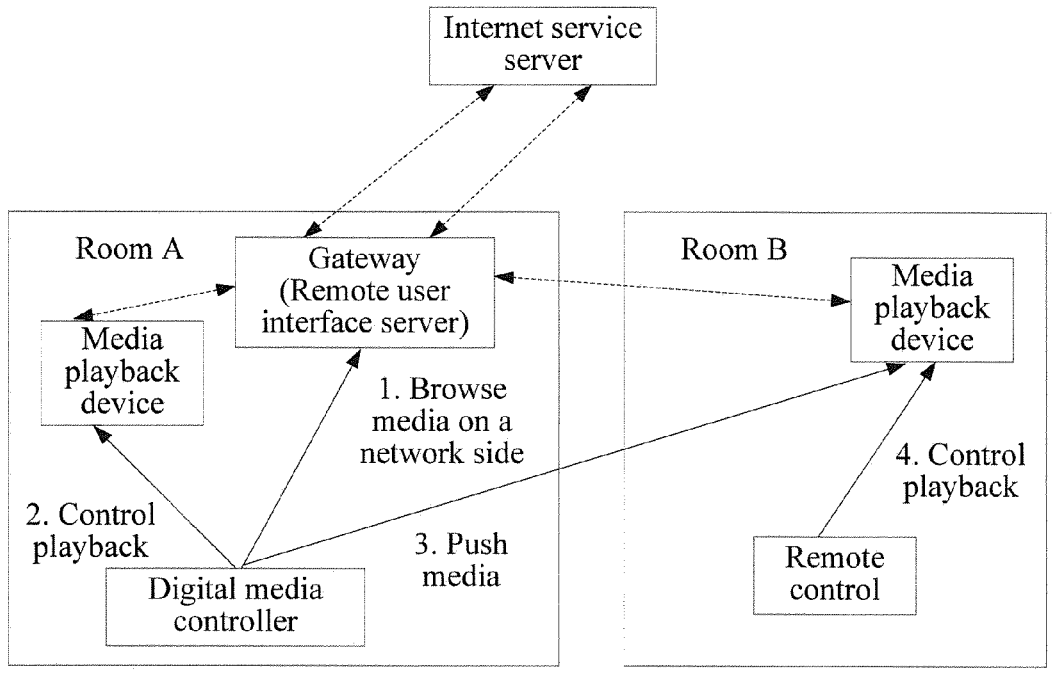
FIG. 1 is a schematic diagram of a scenario to which a method for switching between media play devices applies according to an embodiment of the present invention.

FIG. 1 shows a schematic diagram of a scenario to which a method for switching between media play devices applies according to an embodiment of the present invention. For ease of description, only parts related to this embodiment are shown.

As shown in FIG. 1, an over the top server (English: Over The Top Server, OTT Server for short) is located on a network side of an operator, and is configured to provide a multimedia service to a user; and a gateway (English: Gateway) acquires metadata of media content from the network side in advance, where the metadata includes information about the media content, such as a uniform resource identifier (English: Uniform Resource Identifier, URI for short), play duration, and a file format, the metadata is stored on the gateway, and the gateway functions as a remote user interface server. The gateway herein may be a set top box.

A digital media controller (English: Digital Media Controller, DMC for short) initiates a request message to the gateway, where the request message carries device description information of a media play device in a room A. The media play device includes a digital media player (DMP) and a digital media renderer (DMR), and the device description information includes information about the device, such as a screen size and a resolution. The request message requests the gateway to return, to the media play device in the room A, a user interface that is suitable for the media play device for display; the DMC receives a response message of the request message, acquires a URI that is suitable for the media play device in the room A to display the user interface (English: User Interface, UI for short), sends the URI to the media play device, and invokes a play command to instruct the media play device to play selected media content; and the media play device in the room A sends, according to a protocol, the request message to an address indicated by the URI, to request to play the media content specified by the URI.

It should be noted that, the control device includes but is not limited to the DMC.

When the DMC receives a switching message, the DMC instructs, according to the switching message, the media play device in the room A to terminate a current session and stop current play; and the DMC sends, to a media play device in a room B, the URI sent to the media play device in the room A, to ensure that the media play device in the room B can take the place of the media play device in the room A, to continue to play the same media content, and the DMC sends a timestamp of a current moment of media played by the media play device in the room A to the media play device in the room B, to ensure that the media play device in the room B continues with the play by the media play device in the room A.

However, the media play device in the room B does not have a browsing history of the media play device in the room A, and the user needs to repeatedly browse or search for the media content accessed by the user.

The schematic diagram provided in this embodiment is merely used to explain the present invention, and does not intend to limit the protection scope of the present invention.

Figure 2:
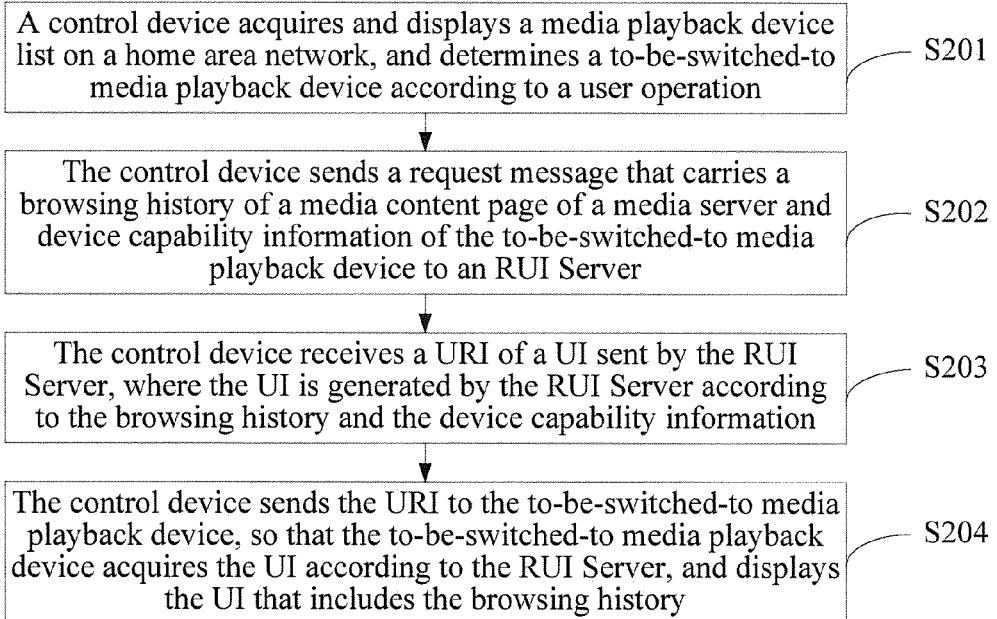
FIG. 2 is an implementation flowchart of a method for switching between media play devices according to another embodiment of the present invention.

FIG. 2 shows an implementation procedure of a method for switching between media play devices according to another embodiment of the present invention. This embodiment is executed by a control device in FIG. 8, and a process of the method is described in detail as follows:

In step S201, the control device acquires and displays a media play device list on a home area network, and determines a to-be-switched-to media play device according to a user operation.

It should be noted that, the media play device includes a DMP or a DMR, and during the switching, there may be one or more to-be-switched-to media play devices.

In step S202, the control device sends a request message that carries a browsing history of a media content page of a media server and device capability information of the to-be-switched-to media play device to a remote user interface server (English: Remote User Interface Server, RUI Server for short), where the device capability information includes at least one of: a resolution and a screen size.

It should be noted that, the device capability information includes but is not limited to the resolution and the screen size.

It should be noted that, the RUI Server may be co-located with the media server, or an independent server may be used as the RUI Server, to generate an interface; the browsing history of the media content page of the media server refers to a browsing history that the user accesses the media content page of the media server by using a switched-from media play device; and device capability information of a to-be-switched-to media play device sent by the control device to the RUI Server may include only the resolution or include only the screen size, or may include both the resolution and the screen size.

It should be noted that, the request message refers to information about requesting to generate the UI.

In step S203, the control device receives a URI of a UI sent by the RUI Server, where the UI is generated by the RUI Server according to the browsing history and the device capability information.

In step S204, the control device sends the URI to the to-be-switched-to media play device, so that the to-be-switched-to media play device acquires the UI according to the URI, and displays a new UI that includes the browsing history.

Optionally, before step S202, the method includes:
recording, by the control device, the browsing history; and
acquiring, by the control device, the device capability information.

Optionally, the recording, by the control device, the browsing history is specifically:
recording, by the control device, the browsing history by using a script embedded in a browser.

It should be noted that, the script embedded in the browser includes a Javascript script, or may be a script of another language; and an event that the user clicks a tag is captured and recorded by the script embedded in the browser, and triggers the script to record a status of the page tag, where the status includes read, unread, and the like. Status information of the browsing history is recorded by using the script, the page marks and differentiates user operations by using different cascading style sheet (English: Cascading Style Sheet, CSS for short) styles according to statuses of different tags, for example, by using styles such as a font color and a font size.

It should be noted that, the control device acquires the foregoing device capability information by using the following two methods:

Method 1: When accessing the home area network, the control device broadcasts a device discovery message to a Simple Service Discovery Protocol (English: Simple Service Discovery Protocol, SSDP for short) port of a preset multicast address; a UPnP device listens the device discovery message, and returns a URI that includes a device type, device capability information, and service description information of the UPnP device to the control device; and the control device retrieves, by using the URI, an identifier of the UPnP device, device capability information corresponding to the identifier of the UPnP device, and service description information supported by a device corresponding to the identifier of the UPnP device, where the UPnP device includes the to-be-switched-to media play device.

Method 2: A UPnP device actively broadcasts a device discovery message, where the device discovery message carries a UPnP type and a URI of the UPnP device; and the control device retrieves, by using the URI, an identifier of the UPnP device, device capability information corresponding to the identifier of the UPnP device, and service description information supported by a device corresponding to the identifier of the UPnP device, where the UPnP device includes the to-be-switched-to media play device.

It should be noted that, the URI refers to a path in which the identifier of the UPnP device, the device capability information corresponding to the identifier of the UPnP device, and the service description information supported by the device corresponding to the identifier of the UPnP device are stored.

It should be noted that, the UPnP device refers to a device that supports a UPnP function, and on the home area network, generally includes the MS, the DMR, the DMP, and the like.

In this embodiment, a control device acquires device capability information of a to-be-switched-to media play device and a recorded browsing history, and sends the device capability information and the browsing history to an RUI Server, so that the RUI Server generates a UI that is suitable for the to-be-switched-to media play device for play and includes a browsing history of a user, and sends a URI of the UI to the control device, which finally, makes the to-be-switched-to media play device acquire and display the UI, and solves a problem in the prior art that, after switching, a browsing history of a switched-from media play device cannot be inherited.

Figure 3:
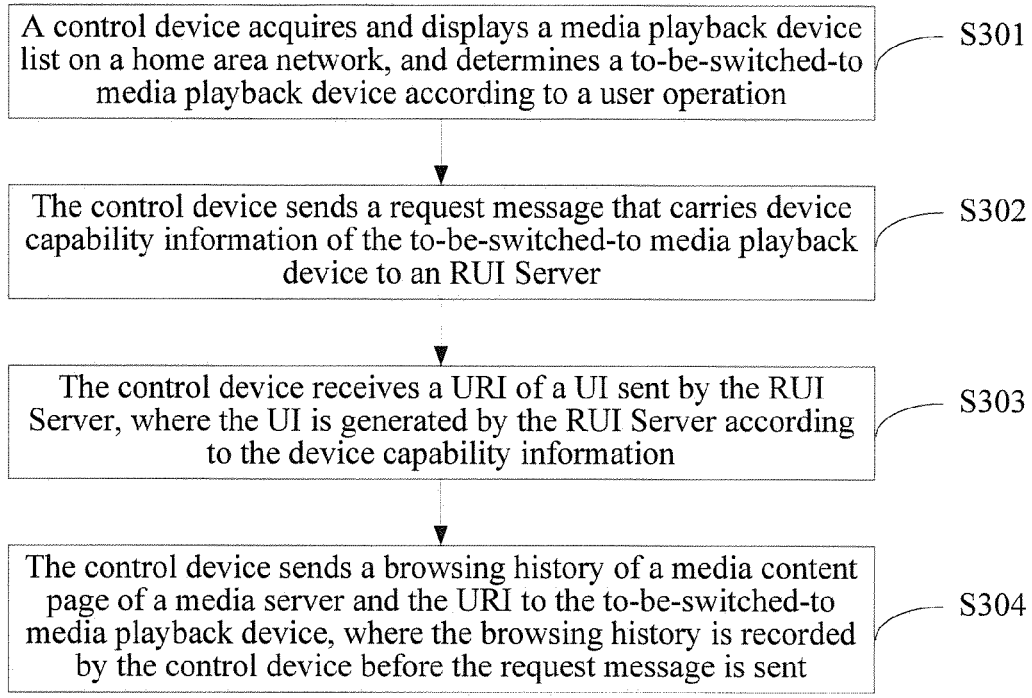
FIG. 3 is an implementation flowchart of a method for switching between media play devices according to another embodiment of the present invention.

FIG. 3 shows an implementation procedure of a method for switching between media play devices according to another embodiment of the present invention. This embodiment is executed by a control device in FIG. 9, and a process of the method is described in detail as follows:

In step S301, the control device acquires and displays a media play device list on a home area network, and determines a to-be-switched-to media play device according to a user operation.

In step S302, the control device sends a request message that carries device capability information of the to-be-switched-to media play device to an RUI Server.

In step S303, the control device receives a URI of a UI sent by the RUI Server, where the UI is generated by the RUI Server according to the device capability information.

In step S304, the control device sends a browsing history of a media content page of a media server and the URI to the to-be-switched-to media play device, where the browsing history is recorded by the control device before the request message is sent, so that the to-be-switched-to media play device acquires the UI, and displays the UI that includes the browsing history.

Optionally, before step S302, the method further includes:
acquiring, by the control device, the device capability information of the to-be-switched-to media play device.

Optionally, that the browsing history is recorded by the control device is specifically that:
the control device records the browsing history by using a script embedded in a browser.

In this embodiment of the present invention, a to-be-switched-to media play device is determined, and a control device sends an address of device capability information and a browsing history to the to-be-switched-to media play device, so that the to-be-switched-to media play device can play and inherit a browsing history of a switched-from media play device.

Figure 4:
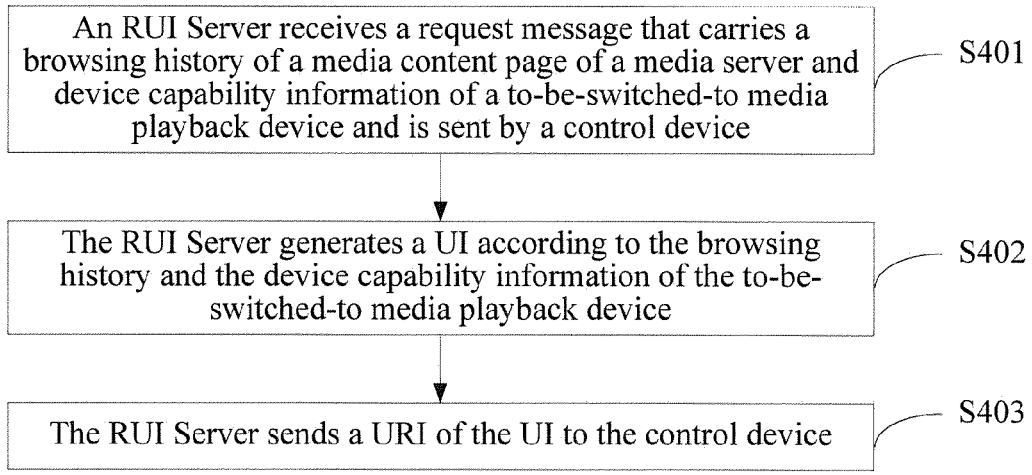
FIG. 4 is an implementation flowchart of a method for switching between media play devices according to another embodiment of the present invention.

FIG. 4 shows an implementation procedure of a method for switching between media play devices according to another embodiment of the present invention. This embodiment is executed by an RUI Server in FIG. 10, and a process of the method is described in detail as follows:

In step S401, the RUI Server receives a request message that carries a browsing history of a media content page of a media server and device capability information of a to-be-switched-to media play device and is sent by a control device, where the device capability information includes at least one of: a resolution and a screen size.

In step S402, the RUI Server generates a UI according to the browsing history and the device capability information of the to-be-switched-to media play device.

In step S403, the RUI Server sends a URI of the UI to the to-be-switched-to media play device by using the control device.

In this embodiment of the present invention, an RUI Server receives a browsing history of a media server and device capability information of a to-be-switched-to media play device that are sent by a control device, and generates a UI according to the browsing history and the capability information of the to-be-switched-to media play device, so that the to-be-switched-to media play device can play and inherit a browsing history of a switched-from media play device.

Figure 5:
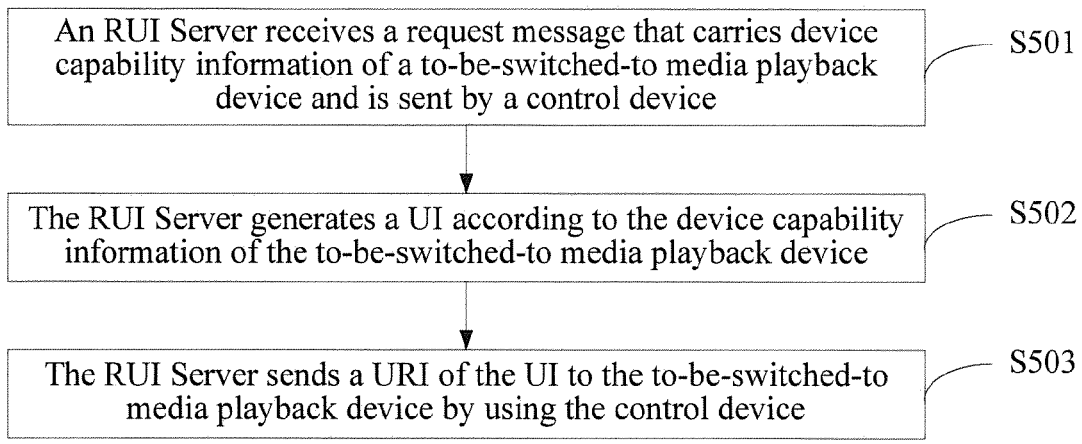
FIG. 5 is an implementation flowchart of a method for switching between media play devices according to another embodiment of the present invention.

FIG. 5 shows an implementation procedure of a method for switching between media play devices according to another embodiment of the present invention. This embodiment is executed by an RUI Server in FIG. 11, and a process of the method is described in detail as follows:

In step S501, the RUI Server receives a request message that carries device capability information of a to-be-switched-to media play device and is sent by a control device.

In step S502, the RUI Server generates a UI according to the device capability information of the to-be-switched-to media play device.

In step S503, the RUI Server sends a URI of the UI to the to-be-switched-to media play device by using the control device.

In this embodiment of the present invention, an RUI Server receives device capability information of a to-be-switched-to media play device sent by a control device, and generates a UI according to the capability information of the to-be-switched-to media play device, so that the to-be-switched-to media play device can acquire the capability information of the to-be-switched-to media play device.

Figure 6:
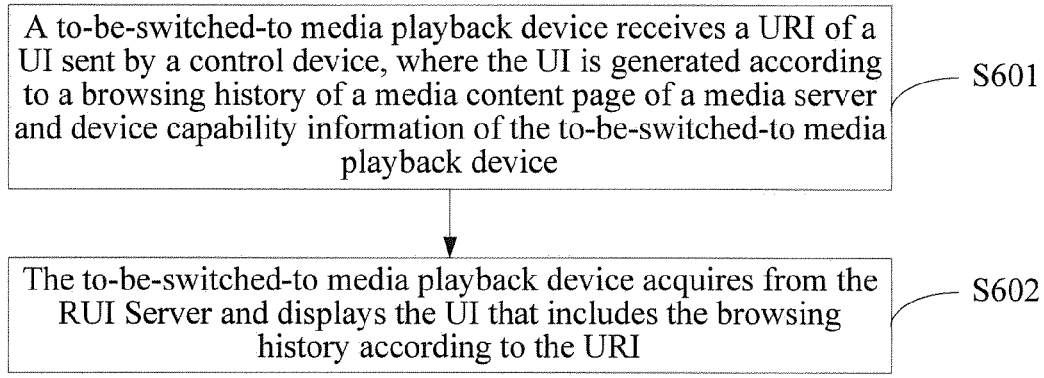
FIG. 6 is an implementation flowchart of a method for switching between media play devices according to another embodiment of the present invention.

FIG. 6 shows an implementation procedure of a method for switching between media play devices according to another embodiment of the present invention. This embodiment is executed by a to-be-switched-to media play device in FIG. 12, and a process of the method is described in detail as follows:

In step S601, the to-be-switched-to media play device receives a URI of a UI sent by a control device, where the UI is generated according to a browsing history of a media content page of a media server and device capability information of the to-be-switched-to media play device.

In step S602, the to-be-switched-to media play device acquires from the RUI Server and displays the UI that includes the browsing history according to the URI.

In this embodiment of the present invention, a to-be-switched-to media play device receives a UI that includes a browsing history and device capability information, and plays and inherits a browsing history of a switched-from media play device by using the UI.

Figure 7:
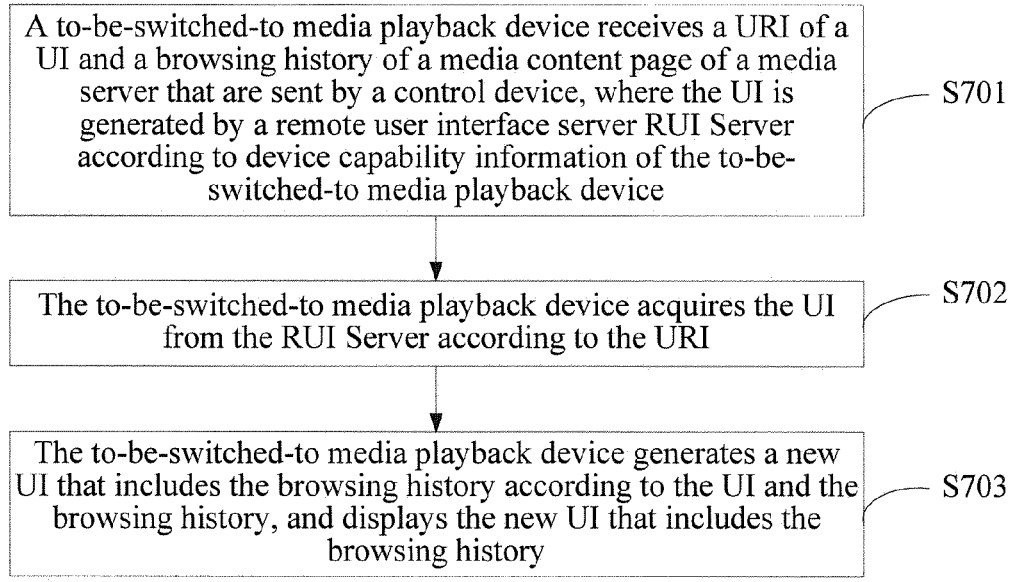
FIG. 7 is an implementation flowchart of a method for switching between media play devices according to another embodiment of the present invention.

FIG. 7 shows an implementation procedure of a method for switching between media play devices according to another embodiment of the present invention. This embodiment is executed by a to-be-switched-to media play device in FIG. 13, and a process of the method is described in detail as follows:

In step S701, the to-be-switched-to media play device receives a URI of a UI and a browsing history of a media content page of a media server that are sent by a control device, where the UI is generated by a remote user interface server RUI Server according to device capability information of the to-be-switched-to media play device.

In step S702, the to-be-switched-to media play device acquires the UI from the RUI Server according to the URI.

In step S703, the to-be-switched-to media play device generates a new UI that includes the browsing history according to the UI and the browsing history, and displays the new UI that includes the browsing history.

In this embodiment of the present invention, a to-be-switched-to media play device receives a browsing history and a UI that is generated according to device capability information of the to-be-switched-to media play device, and generates, according to the UI and the browsing history, and displays a new UI that includes the browsing history, so that a browsing history of a switched-from media play device can be played.

Figure 8:
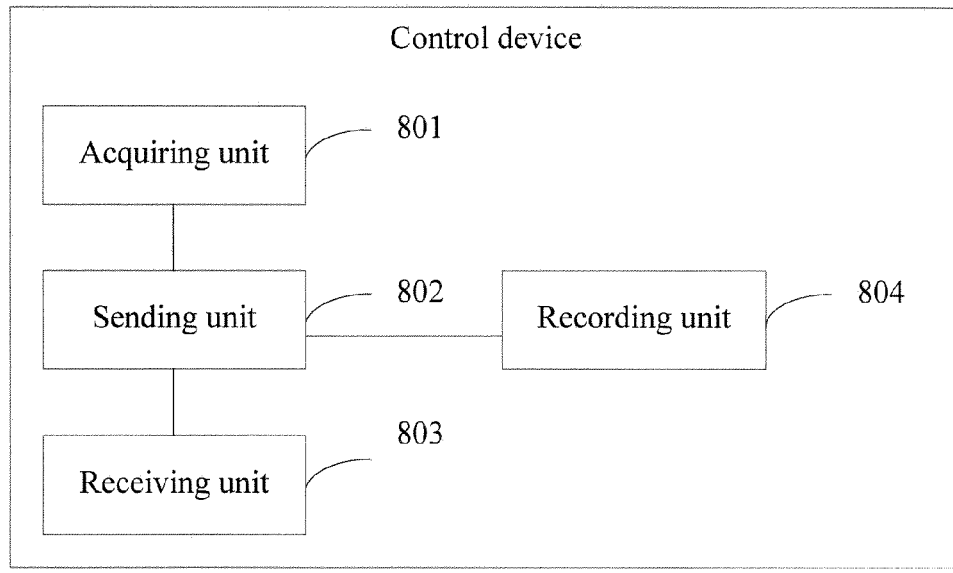
FIG. 8 is a structural composition diagram of a control device for switching between media play devices according to another embodiment of the present invention.

FIG. 8 shows a structural composition diagram of a control device according to another embodiment of the present invention. For ease of description, only parts related to this embodiment of the present invention are shown.

The control device includes:

an acquiring unit 801, configured to acquire and display a media play device list on a home area network, and determine a to-be-switched-to media play device according to a user operation;

a sending unit 802, configured to send a request message that carries a browsing history of a media content page of a media server and device capability information of the to-be-switched-to media play device to an RUI Server, where the device capability information includes at least one of: a resolution and a screen size; and a receiving unit 803, configured to receive a URI of a UI sent by the RUI Server, where the UI is generated according to the browsing history and the device capability information, where the sending unit 802 is further configured to send the URI to the to-be-switched-to media play device.

Optionally, the control device further includes:

a recording unit 804, configured to record the browsing history of the media content page of the media server.

Optionally, the acquiring unit 801 is further configured to acquire the device capability information.

Optionally, the recording unit 804 is specifically configured to:

record the browsing history by using a script embedded in a browser.

The control device for switching between media play devices that is provided in this embodiment can use the foregoing corresponding method for switching between media play devices. Refer to related description in the corresponding embodiment in FIG. 2 for details, which are not provided again herein.

The control device provided in this embodiment solves a problem that a browsing history of a switched-from media play device cannot be inherited.

Figure 9:
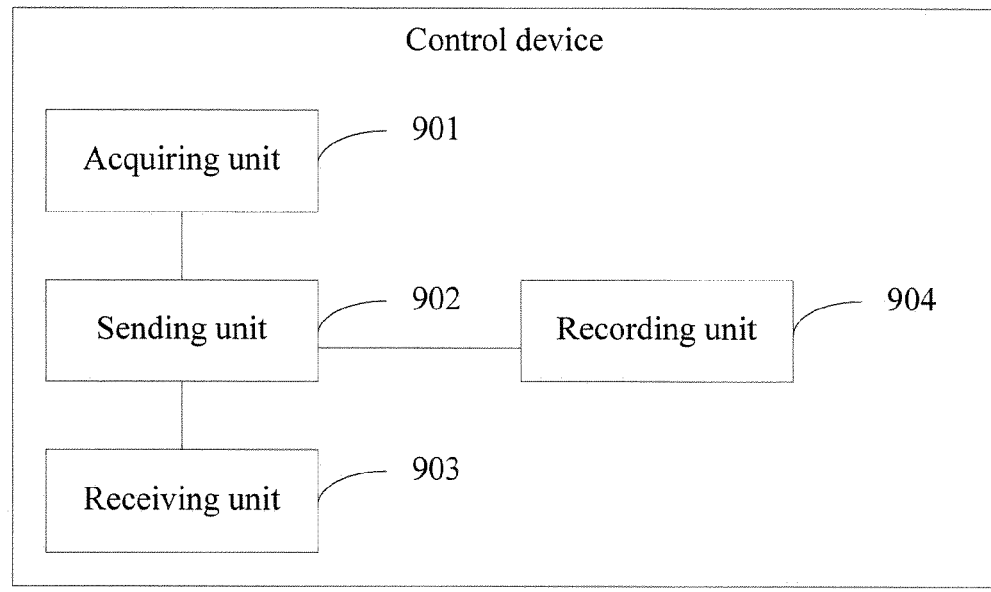
FIG. 9 is a structural composition diagram of a control device for switching between media play devices according to another embodiment of the present invention.

FIG. 9 shows a structural composition diagram of a control device according to another embodiment of the present invention. For ease of description, only parts related to this embodiment of the present invention are shown.

The control device includes:

an acquiring unit 901, configured to acquire and display a media play device list on a home area network, and determine a to-be-switched-to media play device according to a user operation;

a sending unit 902, configured to send a request message that carries device capability information of the to-be-switched-to media play device to an RUI Server, where the device capability information includes at least one of: a resolution and a screen size; and a receiving unit 903, configured to receive a URI of a UI sent by the RUI Server, where the UI is generated by the RUI Server according to the device capability information, where the sending unit 902 is further configured to send a browsing history of a media content page of a media server recorded by the control device and the URI to the to-be-switched-to media play device, where the browsing history is recorded by the control device before the request message is sent.

Optionally, the acquiring unit 901 is further configured to acquire the device capability information.

Optionally, the control device further includes:

a recording unit 904, configured to record the browsing history.

Optionally, the recording unit 904 is specifically configured to:

record the browsing history by using a script embedded in a browser.

In this embodiment of the present invention, an acquiring unit of a control device acquires device capability information of a to-be-switched-to media play device and a recorded browsing history, and sends the device capability information and the browsing history to an RUI Server, so that the RUI Server generates a UI that is suitable for the to-be-switched-to media play device for play and includes a browsing history of a user, and sends a URI of the UI to the control device, which finally, makes the to-be-switched-to media play device acquire and display the UI, and solves a problem that a browsing history of a switched-from media play device cannot be inherited.

The control device provided in this embodiment can use the foregoing corresponding method for switching between media play devices. Refer to related description in the corresponding embodiment in FIG. 3 for details, which are not provided again herein.

Figure 10:
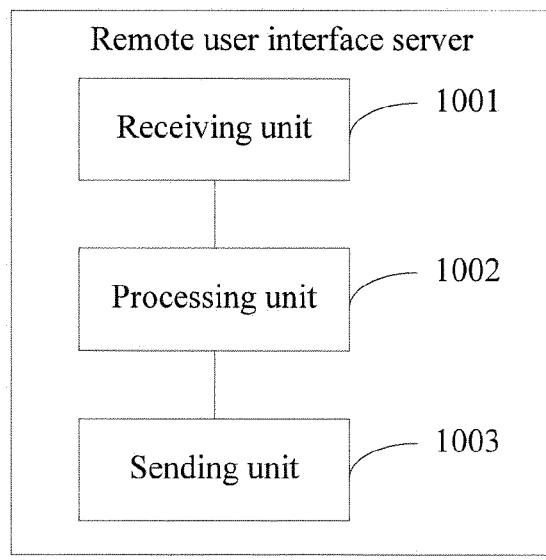
FIG. 10 is a structural composition diagram of a remote user interface server for switching between media play devices according to another embodiment of the present invention.

FIG. 10 shows a structural composition diagram of a remote user interface server according to another embodiment of the present invention. For ease of description, only parts related to this embodiment of the present invention are shown.

The remote user interface server includes:

a receiving unit 1001, configured to receive a request message that carries a browsing history of a media content page of a media server and device capability information of a to-be-switched-to media play device and is sent by a control device, where the device capability information includes at least one of: a resolution and a screen size;

a processing unit 1002, configured to generate a UI according to the browsing history of the media content page of the media server and the device capability information of the to-be-switched-to media play device; and a sending unit 1003, configured to send a URI of the UI to the to-be-switched-to media play device by using the control device.

In this embodiment of the present invention, a remote user interface server receives a request message that carries a browsing history and a device information capability and is sent by a controller, generates a UI according to the browsing history and the device information capability, and sends a URI of the UI to the to-be-switched-to media play device, so that the to-be-switched-to media play device can share a browsing history of a switched-from media play device.

The remote user interface server provided in this embodiment can use the foregoing corresponding method for switching between media play devices. Refer to related description in the corresponding embodiment in FIG. 4 for details, which are not provided again herein.

Figure 11:
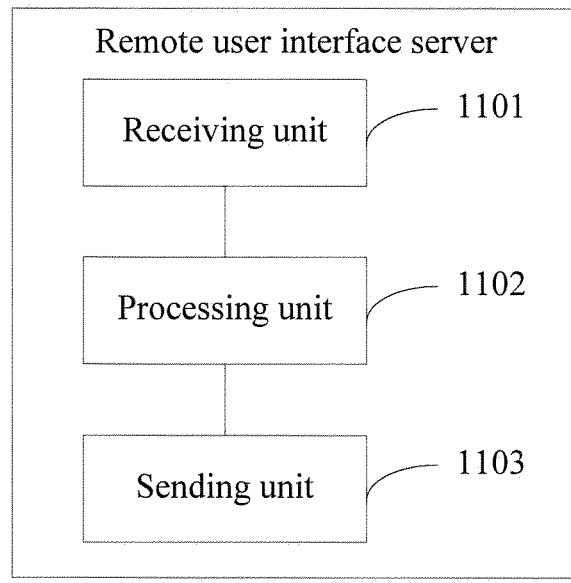
FIG. 11 is a structural composition diagram of a remote user interface server for switching between media play devices according to another embodiment of the present invention.

FIG. 11 shows a structural composition diagram of a remote user interface server according to another embodiment of the present invention. For ease of description, only parts related to this embodiment of the present invention are shown.

The remote user interface server includes:

a receiving unit 1101, configured to receive that carries device capability information of a to-be-switched-to media play device and is sent by a control device;

a processing unit 1102, configured to generate a UI according to the device capability information of the to-be-switched-to media play device; and a sending unit 1103, configured to send a URI of the UI to the to-be-switched-to media play device by using the control device.

In this embodiment of the present invention, a remote user interface server receives device capability information of a to-be-switched-to media play device sent by a control device, generates a UI according to the device capability information of the to-be-switched-to media play device, and sends the UI to the to-be-switched-to media play device; and when receiving a browsing history sent by the control device, the to-be-switched-to media play device can share and play a browsing history of a switched-from media play device.

The remote user interface server provided in this embodiment can use the foregoing corresponding method for switching between media play devices. Refer to related description in the corresponding embodiment in FIG. 5 for details, which are not provided again herein.

Figure 12:
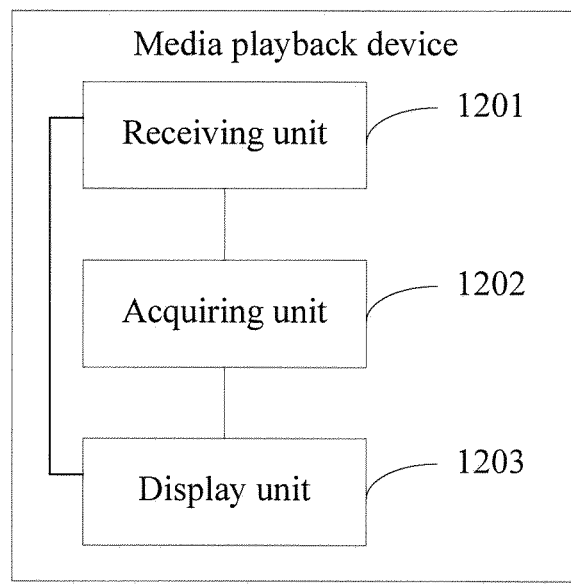
FIG. 12 is a structural composition diagram of a media play device for switching between media play devices according to another embodiment of the present invention.

FIG. 12 shows a structural composition diagram of a media play device according to another embodiment of the present invention. For ease of description, only parts related to this embodiment of the present invention are shown.

The media play device includes:

a receiving unit 1201, configured to receive a URI of a UI sent by a control device, where the UI is generated by a remote user interface server RUI Server according to a browsing history of a media content page of a media server and device capability information of a to-be-switched-to media play device;

an acquiring unit 1202, configured to acquire the UI that includes the browsing history from the RUI Server according to the URI; and a display unit 1203, configured to display the UI that includes the browsing history.

The media play device provided in this embodiment can use the foregoing corresponding method for switching between media play devices. Refer to related description in the corresponding embodiment in FIG. 6 for details, which are not provided again herein.

The media play device provided in this embodiment solves a problem that a browsing history before switching cannot be inherited.

Figure 13:
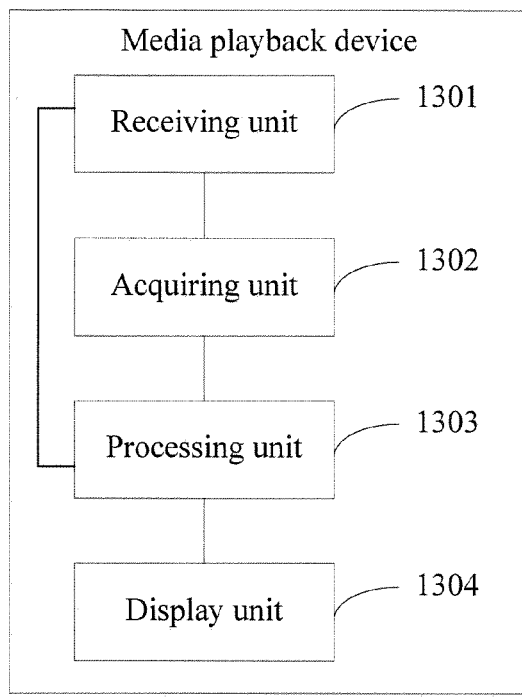
FIG. 13 is a structural composition diagram of a media play device for switching between media play devices according to another embodiment of the present invention.

FIG. 13 shows a structural composition diagram of a media play device according to another embodiment of the present invention. For ease of description, only parts related to this embodiment of the present invention are shown.

The media play device includes:

a receiving unit 1301, configured to receive a URI of a UI and a browsing history of a media content page of a media server that are sent by a control device, where the UI is generated by a remote user interface server RUI Server according to device capability information of the to-be-switched-to media play device;

an acquiring unit 1302, configured to acquire the UI from the RUI Server according to the URI;

a processing unit 1303, configured to generate a new UI that includes the browsing history according to the UI and the browsing history; and a display unit 1304, configured to display the new UI that includes the browsing history.

The media play device provided in this embodiment can use the foregoing corresponding method for switching between media play devices. Refer to related description in the corresponding embodiment in FIG. 7 for details, which are not provided again herein.

The media play device provided in this embodiment solves a problem that a browsing history before switching cannot be inherited.

Figure 14:
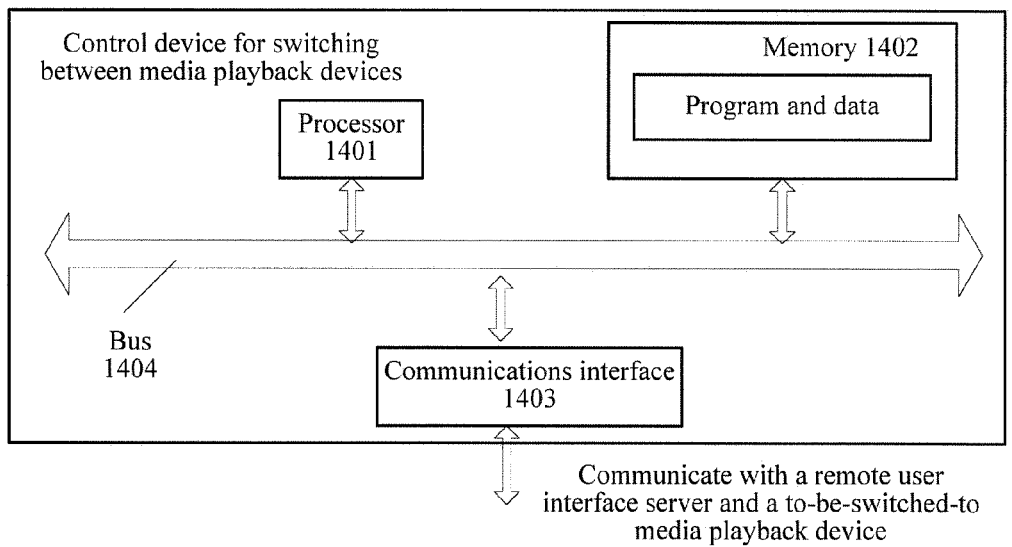
FIG. 14 is a structural hardware diagram of a control device for switching between media play devices according to another embodiment of the present invention.

FIG. 14 shows a structural hardware diagram of a control device according to another embodiment of the present invention. The control device provided in this embodiment of the present invention may be configured to implement the method in the embodiment corresponding to FIG. 2. For ease of description, only parts related to this embodiment of the present invention are shown. For specific technical details that are not disclosed, refer to the corresponding embodiment in FIG. 2.

The control device includes:

a processor 1401, a memory 1402, and a communications interface 1403 that are mutually connected by using a bus 1404, where the bus 1404 may be an industry standard architecture (English: Industry Standard Architecture, ISA for short) bus, a peripheral component interconnect (English: Peripheral Component Interconnect, PCI for short) bus, or the like.

The processor 1401 may be a general purpose processor, including a central processing unit (English: central processing unit, CPU for short), a network processor (English: network processor, NP for short), and the like.

The memory 1402 is configured to store a program and data. Specifically, the program may include program code, where the program code includes a computer operation instruction, and the program is configured to instruct the processor 1401 to send the computer operation instruction. The memory 1402 may include a high-speed random-access memory (English: random-access memory, RAM for short), and may further include a non-volatile memory (non-volatile memory), for example, at least one magnetic disk memory.

The communications interface 1403 is configured to receive or send a message.

The processor 1401 is configured to acquire and display a media play device list on a home area network, and determine a to-be-switched-to media play device according to a user operation.

The communications interface 1403 is configured to: send a request message that carries a browsing history of a media content page of a media server and device capability information of the to-be-switched-to media play device to an RUI Server; receive a URI of a UI sent by the RUI Server, where the UI is generated according to the browsing history and the device capability information; and send the URI to the to-be-switched-to media play device.

Optionally, the processor 1401 is further configured to record the browsing history of the media content page of the media server, and control the communications interface 1403 to acquire the device capability information of the to-be-switched-to media play device.

A person skilled in the art can understand that, a hardware structure shown in FIG. 14 does not constitute a limitation on the control device for switching between media play devices, and may include components that are more or fewer than those shown in the figure, or a combination of some components, or different component arrangements.

The control device provided in this embodiment solves a problem that a browsing history of a switched-from media play device cannot be inherited.

Figure 15:
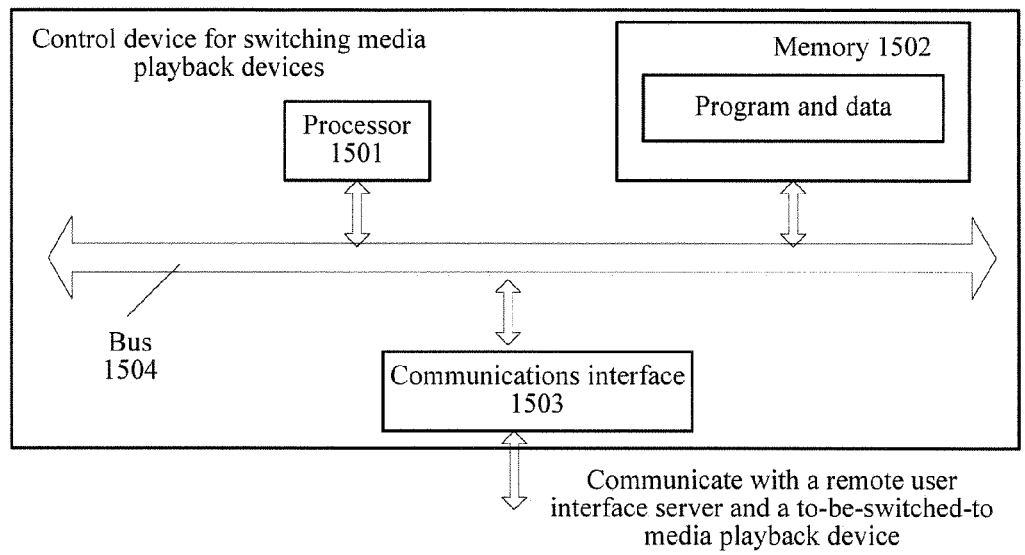
FIG. 15 is a structural hardware diagram of a control device for switching between media play devices according to another embodiment of the present invention.

FIG. 15 shows a structural hardware diagram of a control device according to another embodiment of the present invention. The control device provided in this embodiment of the present invention may be configured to implement the method in the embodiment corresponding to FIG. 3. For ease of description, only parts related to this embodiment of the present invention are shown. For specific technical details that are not disclosed, refer to the corresponding embodiment in FIG. 3.

The control device includes:

a processor 1501, a memory 1502, a communications interface 1503 that are mutually connected by using a bus 1504, where the bus 1504 may be an ISA bus, a PCI bus, or the like.

The processor 1501 may be a general purpose processor, including a CPU, an NP, and the like.

The memory 1502 is configured to store a program and data. Specifically, the program may include program code, where the program code includes a computer operation instruction, and the program is configured to instruct the processor 1501 to send the computer operation instruction. The memory 1502 may include a high-speed random-access memory (English: random-access memory, RAM for short), and may further include a non-volatile memory (non-volatile memory), for example, at least one magnetic disk memory.

The communications interface 1503 is configured to receive or send a message.

The processor 1501 is configured to acquire and display a media play device list on a home area network, and determine a to-be-switched-to media play device according to a user operation.

The communications interface 1503 sends a request message that carries device capability information of the to-be-switched-to media play device to an RUI Server; receives a URI of a UI sent by the RUI Server, where the UI is generated according to the device capability information; and sends a browsing history of a media content page of a media server and the URI to the to-be-switched-to media play device, where the browsing history is recorded by the control device before the request message is sent.

Optionally, the processor 1501 is further configured to control the communications interface 1503 to acquire the device capability information of the to-be-switched-to media play device.

Optionally, the processor 1501 is further configured to record the browsing history of the media content page of the media server.

A person skilled in the art can understand that, a hardware structure shown in FIG. 15 does not constitute a limitation on the control device for switching between media play devices, and may include components that are more or fewer than those shown in the figure, or a combination of some components, or different component arrangements.

The control device provided in this embodiment solves a problem that a browsing history of a switched-from media play device cannot be inherited.

Figure 16:
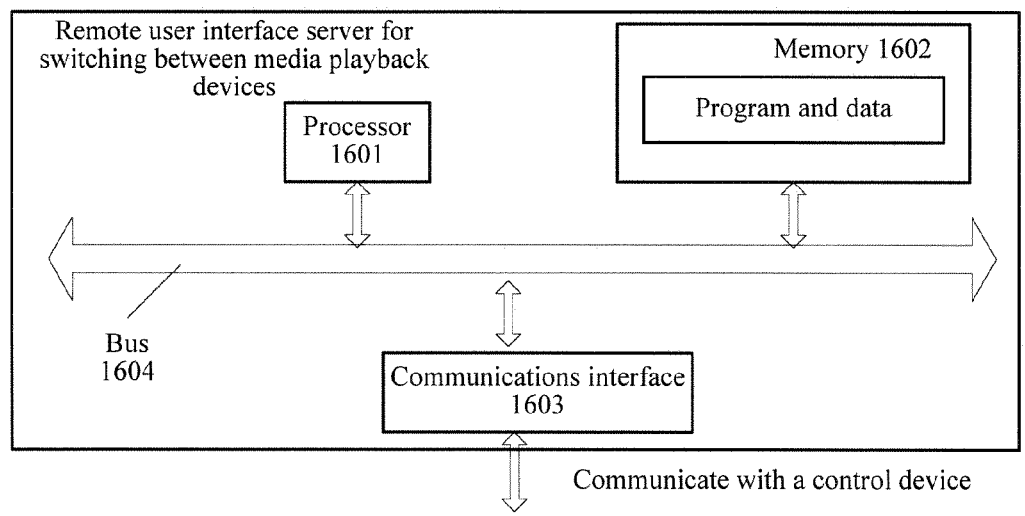
FIG. 16 is a structural hardware diagram of a remote user interface server for switching between media play devices according to another embodiment of the present invention.

FIG. 16 shows a structural hardware diagram of a remote user interface server according to another embodiment of the present invention. The remote user interface server provided in this embodiment of the present invention may be configured to implement the method in the embodiment corresponding to FIG. 4. For ease of description, only parts related to this embodiment of the present invention are shown. For specific technical details that are not disclosed, refer to the corresponding embodiment in FIG. 4.

The remote user interface server includes:

a processor 1601, a memory 1602, a communications interface 1603 that are mutually connected by using a bus 1604, where the bus 1604 may be an ISA bus, a PCI bus, or the like.

The processor 1601 may be a general purpose processor, including a CPU, an NP, and the like.

The memory 1602 is configured to store a program and data. Specifically, the program may include program code, where the program code includes a computer operation instruction, and the program is configured to instruct the processor 1601 to send the computer operation instruction. The memory 1602 may include a high-speed random-access memory (English: random-access memory, RAM for short), and may further include a non-volatile memory (non-volatile memory), for example, at least one magnetic disk memory.

The communications interface 1603 is configured to receive or send a message.

The communications interface 1603 is configured to receive that carries a browsing history of a media content page of a media server and device capability information of a to-be-switched-to media play device and is sent by a control device, where the device capability information includes at least one of: a resolution and a screen size.

The processor 1601 is configured to generate a UI according to the browsing history and the device capability information of the to-be-switched-to media play device.

The communications interface 1603 is configured to send a URI of the UI to the to-be-switched-to media play device by using the control device.

A person skilled in the art can understand that, a hardware structure shown in FIG. 16 does not constitute a limitation on the remote user interface server for switching between media play devices, and may include components that are more or fewer than those shown in the figure, or a combination of some components, or different component arrangements.

The remote user interface server provided in this embodiment of the present invention can enable a to-be-switched-to media play device to share a browsing history of a switched-from media play device.

Figure 17:
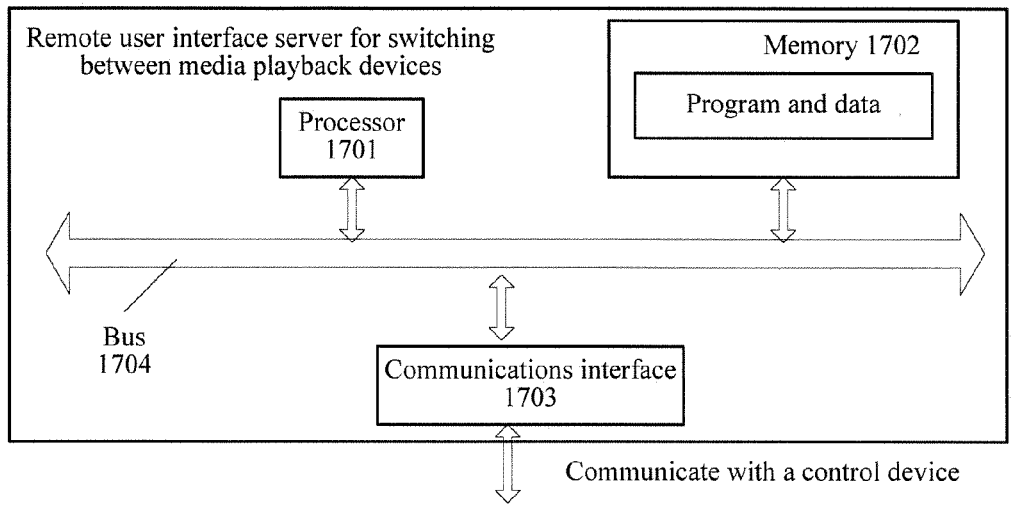
FIG. 17 is a structural hardware diagram of a remote user interface server for switching between media play devices according to another embodiment of the present invention.

FIG. 17 shows a structural hardware diagram of a remote user interface server according to another embodiment of the present invention. The remote user interface server provided in this embodiment of the present invention may be configured to implement the method in the embodiment corresponding to FIG. 5. For ease of description, only parts related to this embodiment of the present invention are shown. For specific technical details that are not disclosed, refer to the corresponding embodiment in FIG. 5.

The remote user interface server includes:

a processor 1701, a memory 1702, a communications interface 1703 that are mutually connected by using a bus 1704, where the bus 1704 may be an ISA bus, a PCI bus, or the like.

The processor 1701 may be a general purpose processor, including a CPU, an NP, and the like.

The memory 1702 is configured to store a program and data. Specifically, the program may include program code, where the program code includes a computer operation instruction, and the program is configured to instruct the processor 1701 to send the computer operation instruction. The memory 1702 may include a high-speed random-access memory (English: random-access memory, RAM for short), and may further include a non-volatile memory (non-volatile memory), for example, at least one magnetic disk memory.

The communications interface 1703 is configured to receive or send a message.

The communications interface 1703 is configured to receive a request message that carries device capability information of a to-be-switched-to media play device and is sent by a control device.

The processor 1701 is configured to generate a UI according to the device capability information of the to-be-switched-to media play device.

The communications interface 1703 is further configured to send a URI of the UI to the control device.

A person skilled in the art can understand that, a composition structure shown in FIG. 17 does not constitute a limitation on the remote user interface server for switching between media play devices, and may include components that are more or fewer than those shown in the figure, or a combination of some components, or different component arrangements.

The remote user interface server provided in this embodiment of the present invention can enable a to-be-switched-to media play device to share a browsing history of a switched-from media play device.

Figure 18:
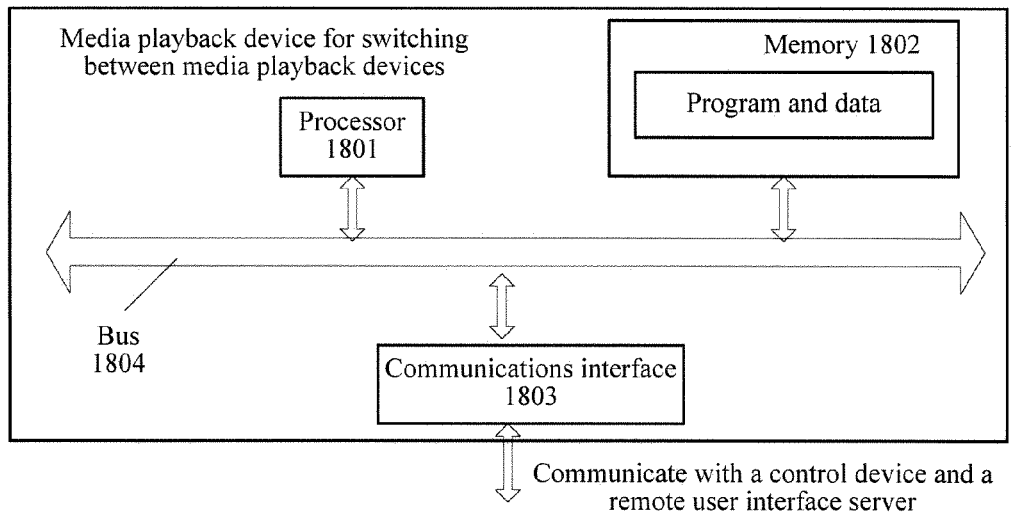
FIG. 18 is a structural hardware diagram of a media play device for switching between media play devices according to another embodiment of the present invention.

FIG. 18 shows a structural hardware diagram of a media play device according to another embodiment of the present invention. The media play device provided in this embodiment of the present invention may be configured to implement the method in the embodiment corresponding to FIG. 6. For ease of description, only parts related to this embodiment of the present invention are shown. For specific technical details that are not disclosed, refer to the corresponding embodiment in FIG. 6.

The media play device includes:

a processor 1801, a memory 1802, a communications interface 1803 that are mutually connected by using a bus 1804, where the bus 1804 may be an ISA bus, a PCI bus, or the like.

The processor 1801 may be a general purpose processor, including a CPU, an NP, and the like.

The memory 1802 is configured to store a program and data. Specifically, the program may include program code, where the program code includes a computer operation instruction, and the program is configured to instruct the processor 1801 to send the computer operation instruction. The memory 1702 may include a high-speed random-access memory (English: random-access memory, RAM for short), and may further include a non-volatile memory (non-volatile memory), for example, at least one magnetic disk memory.

The communications interface 1803 is configured to receive or send a message.

The communications interface 1803 is configured to receive a URI of a UI sent by a control device, where the UI is generated by a remote user interface server RUI Server according to a browsing history of a media content page of a media server and device capability information of a to-be-switched-to media play device.

The communications interface 1803 is further configured to acquire the UI that includes the browsing history from the RUI Server according to the URI.

The processor 1801 is configured to control a display screen to display the UI that includes the browsing history.

A person skilled in the art can understand that, a composition structure shown in FIG. 18 does not constitute a limitation on the media play device for switching between media play devices, and may include components that are more or fewer than those shown in the figure, or a combination of some components, or different component arrangements.

The media play device provided in this embodiment solves a problem that a browsing history before switching cannot be inherited.

Figure 19:
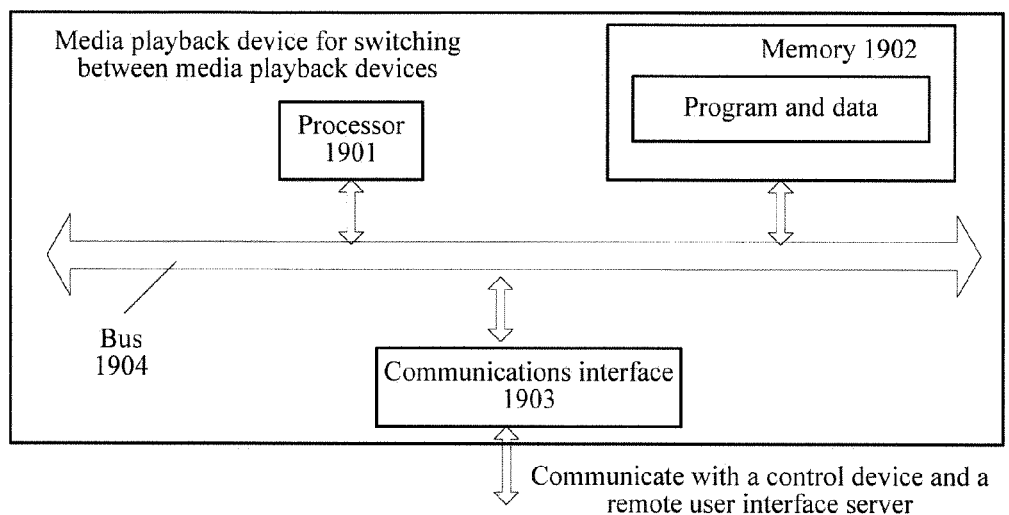
FIG. 19 is a structural hardware diagram of a media play device for switching between media play devices according to another embodiment of the present invention.

FIG. 19 shows a structural hardware diagram of a media play device according to another embodiment of the present invention. The media play device provided in this embodiment of the present invention may be configured to implement the method in the embodiment corresponding to FIG. 7. For ease of description, only parts related to this embodiment of the present invention are shown. For specific technical details that are not disclosed, refer to the corresponding embodiment in FIG. 7.

The media play device includes:

a processor 1901, a memory 1902, a communications interface 1903 that are mutually connected by using a bus 1904, where the bus 1904 may be an ISA bus, a PCI bus, or the like.

The processor 1901 may be a general purpose processor, including a CPU, an NP, and the like.

The memory 1902 is configured to store a program and data. Specifically, the program may include program code, where the program code includes a computer operation instruction, and the program is configured to instruct the processor 1801 to send the computer operation instruction. The memory 1702 may include a high-speed random-access memory (English: random-access memory, RAM for short), and may further include a non-volatile memory (non-volatile memory), for example, at least one magnetic disk memory.

The communications interface 1903 is configured to receive or send a message.

The communications interface 1903 is configured to receive a URI of a UI and a browsing history of a media content page of a media server that are sent by a control device, where the UI is generated by a remote user interface server RUI Server according to device capability information of the to-be-switched-to media play device.

The communications interface 1903 is further configured to acquire the UI from the RUI Server according to the URI.

The processor 1901 is configured to generate a new UI that includes the browsing history according to the UI and the browsing history, and control a display screen to display the new UI that includes the browsing history.

The media play device provided in this embodiment solves a problem that a browsing history before switching cannot be inherited.

In the foregoing embodiment, a remote user interface server receives a browsing history and device capability information that are sent by a control device, generates a UI that includes the browsing history, and sends the UI to a to-be-switched-to media play device; or a remote user interface server receives device capability information sent by a control device, generates a UI, and sends the UI to a to-be-switched-to media play device, and the control device sends a browsing history also to the to-be-switched-to media play device. A media play device shares and plays a browsing history of a switched-from media play device in the foregoing two manners, implementing media sharing.

A person of ordinary skill in the art may understand that, in the media play device for switching between media play devices, which is provided in the foregoing embodiment, the included units are divided based only on function logic, and the division is not limited to the foregoing division and is acceptable as long as the division can implement a corresponding function; additionally, a specific name of each functional unit is only for easy differentiation from each other, and is not used to limit the protection scope of this application.

A person of ordinary skill in the art may also understand that all or a part of the steps of the methods in the embodiments may be implemented by a program instructing relevant hardware. The program may be stored in a readable storage medium. The storage medium includes a ROM/RAM or the like.

The foregoing descriptions are merely exemplary embodiments of the present invention, but are not intended to limit the present invention. Any modification, equivalent replacement, or improvement made without departing from the spirit and principle of the present invention should fall within the protection scope of the present invention.

What is claimed is:

1. A method for switching between media play devices, the method comprising:

acquiring and displaying, by a control device, a media play device list on a home area network, and determining a to-be-switched-to media play device according to a user operation;

sending, by the control device, a request message that carries a browsing history of a media content page of a media server and device capability information of the to-be-switched-to media play device to a remote user interface (RUI) server, wherein the device capability information comprises at least one of: a resolution and a screen size;

receiving, by the control device, a uniform resource identifier (URI) of a user interface (UI) sent by the RUI server, wherein the UI is generated by the RUI server according to the browsing history and the device capability information; and sending, by the control device, the URI to the to-be-switched-to media play device.

2. The method according to claim 1, wherein before sending, by the control device, a request message that carries a browsing history of a media content page of a media server and device capability information of the to-be-switched-to media play device to an RUI server, the method further comprises:

recording, by the control device, the browsing history; and acquiring, by the control device, the device capability information.

3. The method according to claim 2, wherein recording, by the control device, the browsing history of the media content page of the media server comprises:

recording, by the control device, the browsing history by using a script embedded in a browser.

4. A method for switching between media play devices, the method comprising:

acquiring and displaying, by a control device, a media play device list on a home area network, and determining a to-be-switched-to media play device according to a user operation;

sending, by the control device, a request message that carries device capability information of the to-be-switched-to media play device to a remote user interface (RUI) server, wherein the device capability information comprises at least one of: a resolution and a screen size;

receiving, by the control device, a uniform resource identifier (URI) of a user interface (UI) sent by the RUI server, wherein the UI is generated by the RUI server according to the device capability information; and sending, by the control device, a browsing history of a media content page of a media server and the URI to the to-be-switched-to media play device, wherein the browsing history is recorded by the control device before the request message is sent.

5. The method according to claim 4, wherein before sending, by the control device, a request message that carries device capability information of the to-be-switched-to media play device to a remote user interface server RUI server, the method further comprises:

acquiring, by the control device, the device capability information.

6. The method according to claim 4, wherein that the browsing history is recorded by the control device comprises:

recording, by the control device, the browsing history by using a script embedded in a browser.

7. A method for switching between media play devices, the method comprising:

receiving, by a to-be-switched-to media play device, a uniform resource identifier (URI) of a user interface (UI) sent by a control device, wherein the UI is generated by a remote user interface (RUT) server according to a browsing history of a media content page of a media server and device capability information of the to-be-switched-to media play device; and acquiring from the RUI server and displaying, by the to-be-switched-to media play device, the UI that comprises the browsing history according to the URI.

* * * * *

UNITED STATES PATENT AND TRADEMARK OFFICE
CERTIFICATE OF CORRECTION

PATENT NO. : 9,866,606 B2
APPLICATION NO. : 14/901832
DATED : January 9, 2018
INVENTOR(S) : Yajun Zhang and Yu Zhu It is certified that error appears in the above-identified patent and that said Letters Patent is hereby corrected as shown below:

On the Title Page

(73) Assignee:
Please delete "Huawei Technologies Co., Ltd." and insert -- Huawei Device Co., Ltd. --

Signed and Sealed this
Twenty-seventh Day of November, 2018

Andrei Iancu
*Director of the United States Patent and Trademark Office*